United States Patent
Byrd et al.

[15] 3,692,203
[45] Sept. 19, 1972

[54] CARGO CONTAINER FOR AIRCRAFT

[72] Inventors: Chester L. Byrd; Randal L. Blackwell, both of Tulsa, Okla.

[73] Assignee: Air Cargo Equipment Corp., Tulsa, Okla.

[22] Filed: May 3, 1971

[21] Appl. No.: 139,771

[52] U.S. Cl. ..................220/1.5, 220/4, 220/29, 244/118, 244/137 R
[51] Int. Cl. .....................................B65d 87/14
[58] Field of Search ........244/118 R, 137 R; 220/1.5, 220/4, 29; 217/12; 190/15.1

[56] References Cited

UNITED STATES PATENTS

| | | | |
|---|---|---|---|
| 560,140 | 5/1896 | Lynn | 220/29 |
| 3,026,071 | 7/1957 | Barcelona et al. | 244/137 R |
| 3,598,273 | 8/1971 | Rau et al. | 220/1.5 |
| 3,612,335 | 10/1971 | Schurman | 220/31 S |

*Primary Examiner*—Milton Buchler
*Assistant Examiner*—Jesus D. Sotelo
*Attorney*—William S. Dorman

[57] ABSTRACT

A cargo container of lightweight material particularly designed and constructed for the carrying of luggage and the like in the lower portion or belly cargo compartment of commercial aircraft. The construction is largely of replaceable and interchangeable panels which are easily formed and particularly adaptable to the normal air freight environment.

12 Claims, 16 Drawing Figures

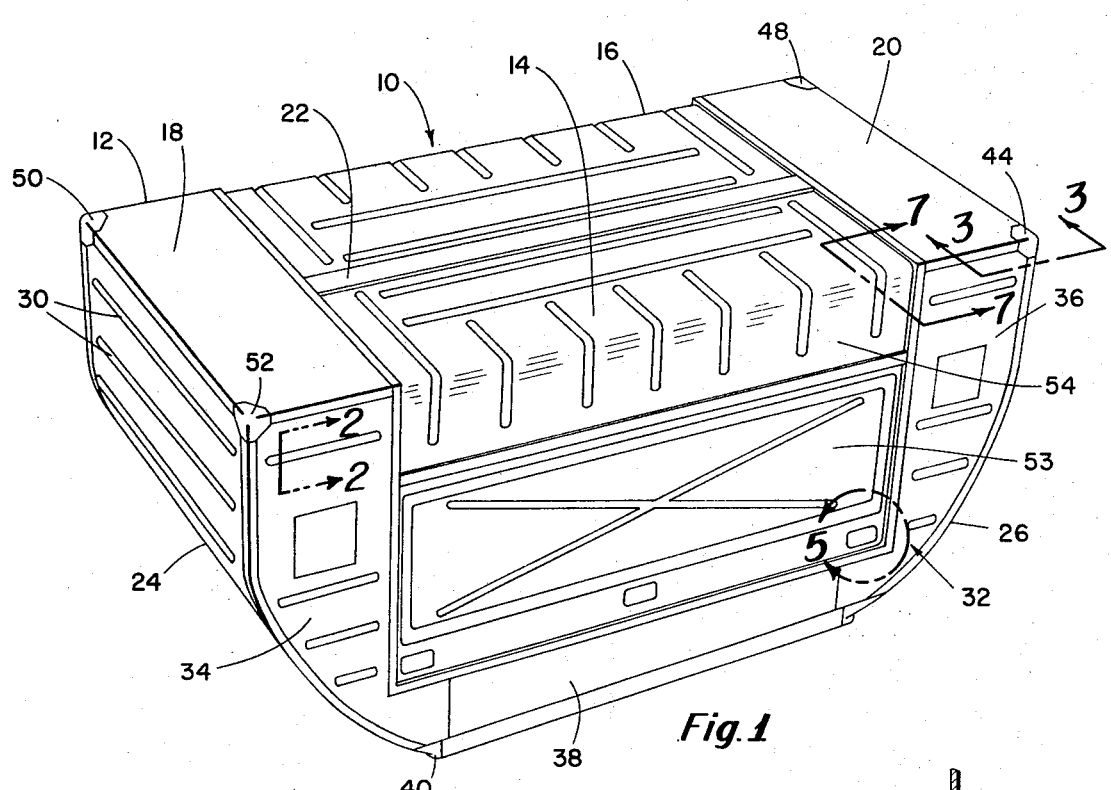
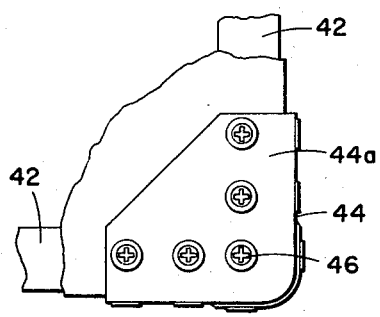
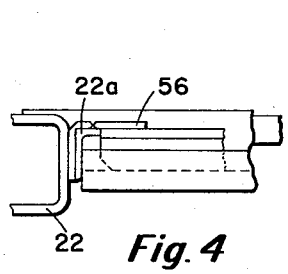
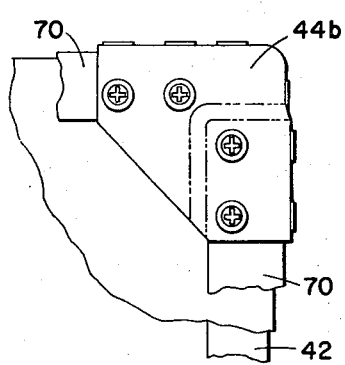
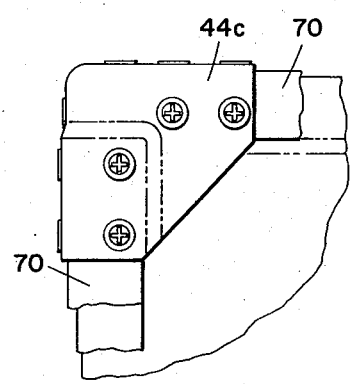
CHESTER L. BYRD
RANDAL L. BLACKWELL
INVENTORS.
BY William S. Dorman
ATTORNEY

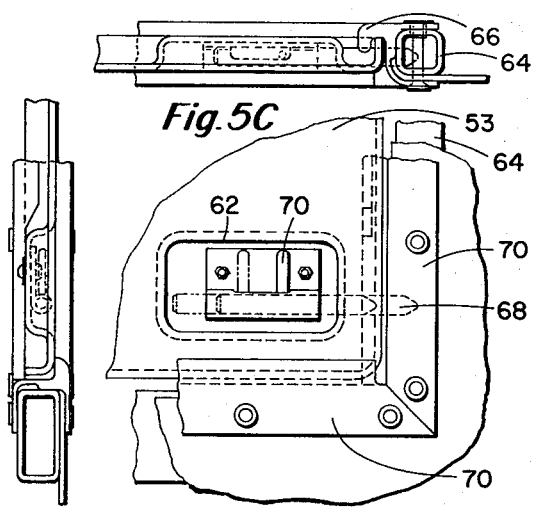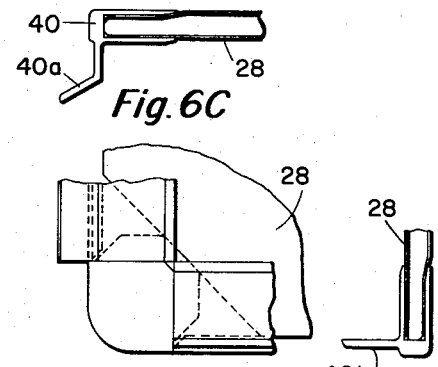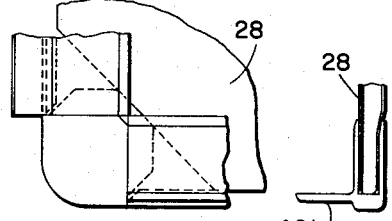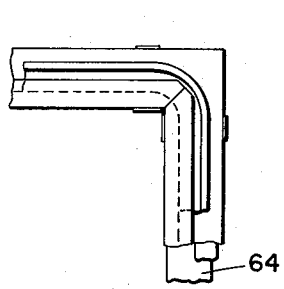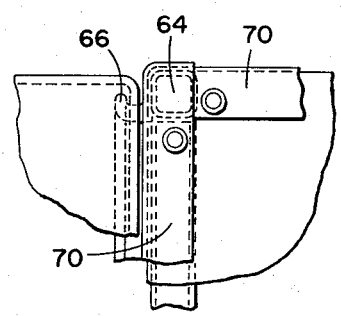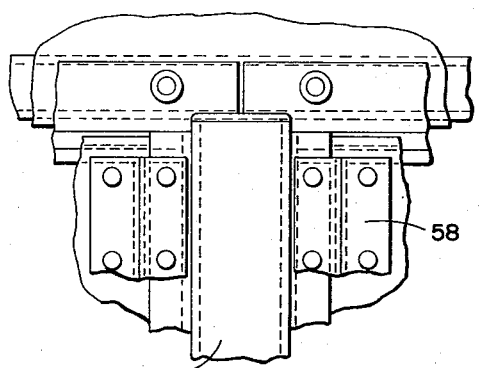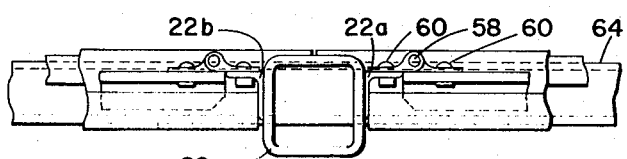

CARGO CONTAINER FOR AIRCRAFT

This invention relates to improvements in cargo containers for air- craft and more particularly, but not by way of limitation to a cargo container for aircraft particularly designed and constructed for the carrying of luggage and the like in the lower portion or belly cargo compartment of commercial aircraft.

At the present time, aircraft passengers' luggage and the like are stored in individual containers which are in turn stowed in the belly cargo compartment of the aircraft during flight. Normally, each container is filled with luggage going to a common destination and when the aircraft arrives at a destination, only those containers having the luggage for that particular destination need be unloaded. These containers are normally constructed from aluminum or other similar metallic alloys in order that they be lightweight. The treatment of handling such containers is usually quite rough and dents or ruptures usually occur which render the container unuseable in a relatively short time. As a result, the use of such containers has become rather expensive, particularly considering the frequent replacement cost.

The present invention contemplates a novel cargo container for carrying luggage and the like on aircraft which is designed and constructed for overcoming the above disadvantages. The container is constructed from a non-metallic, plastic type alloy which is lightweight, easy to form and practically indestructible under normal airport cargo handling use. In the event that said container is damaged in handling, its construction, a plurality of individual panels which are easily replaceable and repairable, causes the container to be out of use for only a short time and to be completely reuseable at a subsequent time. The panels are secured together by common screws and nuts or rivets which render replacement thereof very easy.

It is an important object of this invention to provide a cargo container for aircraft, constructed of a lightweight non-metallic material particularly designed and constructed for the carrying of aircraft passengers' luggage.

It is another object of this invention to provide a cargo container for aircraft wherein construction thereof is of a plurality of individual panels which are easily replaceable when damaged.

It is still another object of this invention to provide a cargo container which is simple and efficient in use and economical and durable in construction.

Other and further objects and advantageous features of the present invention will hereinafter more fully appear in connection with a detailed description of the drawings in which:

FIG. 1 is a perspective view of a cargo container for aircraft embodying the invention.

FIG. 2 is a sectional view of a front panel taken along the line 2—2 of FIG. 1.

FIGS. 3A, 3B, and 3C are three views in orthographic projection of a typical corner attach member, FIG. 3A being taken along the line 3—3 of FIG. 1.

FIG. 4 is a half sectional view of a plastic hinge member.

FIG. 4A is a full sectional view of a piano type hinge configuration also taken along the line 4—4 of FIG. 1, FIG. 4b being a top view thereof.

FIG. 5 is a three view orthographic projection of the door latch mechanism taken along the line 5—5 of FIG. 1.

FIGS. 6A, 6B, and 6C are three views in orthographic projection of a typical bottom corner attach member.

FIG. 7A is a sectional view of the top corner door and frame attach configuration taken along the line 7—7 of FIG. 1, FIG. 7b being the front view thereof.

Referring to the drawings in detail, reference character 10 generally indicates a cargo container for aircraft comprising generally a housing assembly 12 and a pair of substantially identical doors 14 and 16. The design and construction of the container is symmetric about a transverse vertical plane passed through the center of said container 10 and reference in this specification to front and rear are simply for ease of description. Similarly, the container is symmetric about a longitudinal vertical plane passed through the center of the container which results in many of the components making up said container being identical and interchangable as will be hereinafter set forth.

The housing assembly 12 comprises a spaced pair of substantially identical top panels 18 and 20 and an elongated top cross member 22 having any suitable cross-sectional shape, such as the rectangular shaped tubing shown in FIG. 4 with associated oppositely disposed hinge attachment flanges 22a, and 22b secured thereto, said top cross member being longitudinally and centrally disposed between the top panels 18 and 20 and secured thereto in a manner that will be hereinafter set forth. A spaced pair of substantially identical end panels 24 and 26 are attached by the upper edges thereof to the outside edges of the top panels 18 and 20, respectively, and at right angles thereto. The lower portion of said end panels are curved inwardly to conform generally to the cross-sectional shape of the cargo hold, belly compartment, main cargo compartment, or the like, of an aircraft (not shown). The end panels 24 and 26 are provided with a plurality of spaced parallel horizontal detents 30 (detail in FIG. 2) for adding strength and rigidity to said panels. A rectangular floor panel 28 (FIG. 6) is secured at each end thereof to the lower edges of the end panels 24 and 26. The floor panel 28 may also be provided with both longitudinal and transverse detents 30 as needed for adding strength and rigidity thereto. A substantially U-shaped front face assembly 32 is attached at right angles to the top, end and floor panels to make up a front face of the container housing assembly 12. The front face assembly 32 comprises a spaced pair of front face panels 34 and 36, the top portion of each panel being of a rectangular shape and the bottom outside edge of said panels having an arcuate curvature compatible with the inward curvature of each respective end panel 24 and 26. The face panel 34 is attached along the upper edge thereof to the front edge of the top panel 18 and along the outside edge thereof with the front edge of the end panel 24. Similarly, the front face panel 36 is attached to the front edges of the top and end panels 20 and 26. Each front face panel 34 and 36 is provided with a plurality of parallel horizontally disposed detents 30 (FIG. 2 detail) for adding strength and stability thereto. A front base panel 38 is secured at each end thereof to the lower inside edges of the front face panels 34 and 36, said base panel 38 being attached along the bottom edge thereof to the front edge of the floor panel 28 and at right angles thereto. The attachment of the panels making up the front face assembly 32 will be hereinafter set forth. A rear face assembly (not shown) substantially identical to the front face assembly 32 is attached to the rear edges of the top, end and floor panels to form the rear face of the container housing 12.

Referring now to FIGS. 6A, B, and C, reference character 40 represents a typical floor panel attachment means comprising a horizontally disposed channel member for accepting the floor panel 28 therein, the portion bordering the outside edge of said floor panel having an upwardly extending angled flange 40a for attaching the end panel 24 thereto by ordinary screws and nuts (not shown). The portion of said attachment means 40 bordering the front edge of the floor panel 28 has an upwardly extending flange 40b for attachment of the front face panels 34 and 36 and the front base panel 38 thereto by suitable bolts, and nuts (not shown). Similarly, the entire outer periphery of the floor panel 28 is attached to the respective upwardly extending panels as hereinabove set forth.

Referring to FIGS. 3A, B and C, reference character 42 represents a typical tubular framing member which surrounds the front, rear and outer edge of the top panel 20 and similarly, the outside edge of the front face panel 36. The panels may be attached to the framing members 42 by suitable screws and nuts. A corner jointing means 44 comprising three mutually perpendicular plate members 44a, b, and c is attached at the intersecting corners of the top panel 20, the end panel 26 and the front face panel 36 by suitable screws 46 which extend through the jointing means 44, the respective panels and the frame members 42. Similarly, the other three corner joints 48, 50 and 52 are attached by substantially identical jointing means as that of 44.

The front door 14 comprises generally a subdoor panel 53 and an upper door member 54 of a substantially inverted L-shaped cross-sectional configuration with side edges thereof disposed in the proximity of the inside edges of the top panels 18 and 20 and the upper portion of the front face panels 34 and 36. One edge of the door member 54 is hingedly secured to the top cross member flange 22a by a suitable strip hinge means such as a plastic hinge 56 (FIG. 4) or a piano type hinge 58 (FIG. 4A and 4B). The hinge member 56 or 58 is attached to the door member 54 and the flange 22a by suitable bolts and nuts 60. The door member 54 is provided with a plurality of transverse and longitudinal detents 30 (FIG. 2) for adding strength and rigidity thereto. The vertically disposed subdoor panel 53 is rectangular in shape, one edge thereof being hingedly attached to the free edge of the upper door member 54, the opposite edge being disposed in the proximity of the upper edge of the front base panel 38 when the door is in a closed position. The outer periphery of the door 14 is provided with an inwardly extending lip which may be formed as an integral part of the panels 53 and 54.

The inside edges of the top panels 18 and 20, and the front face assembly 32 is provided with a tubular frame member 64, said panels being attached to the frame member 64 by suitable bolts or screws (not shown). The inside of the tubular frame members 64 adjacent to the doors 14 and 16 are provided with an outwardly extending channel member 66 for receiving the door edge lip therein (FIGS. 7A and 6). One or more latch mechanisms 62 are provided along the lower edge of the subdoor 53 and secured thereto in a manner generally indicated in FIGS. 5A, B and C. The latch mechanism 62 comprises a slidable bolt member 68 and handle means 70 secured thereto. When the door 14 is in a closed position the bolt member 68 may be extended outwardly through an opening provided in the door edge lip 61 and subsequently through an opening provided in the tubular frame member 64 as depicted in the drawings of FIGS. 5A, B, and C.

The oppositely disposed rear door 16 is substantially identical to the door 14 and is completely interchangeable therewith. The rear door 16 is hingedly secured to the top cross member flange 22b in a manner similar to that of the front door 14 attachment hereinabove set forth.

Further rigidity may be obtained by providing a plurality of angle framing segments 70 along the entire periphery of the container edges formed by the abutting panels. The framing segments 70 are secured by a plurality of suitable fasteners 72 as depicted in FIGS. 5 and 7. Due to the construction of the channels 40, the framing segments 70 need not be used around the periphery of the floor plate 28.

It should be noted that the panels making up the container 10 may be of any durable self-extinguishing plastic type material such as the acrylic PVC alloy "Kydex", but not limited thereto, which is produced in sheets by Rohm and Haas for use in the manufacture of thermo formed parts. Such materials have advantageous properties of rigidity, formability, toughness, chemical resistance, and the particular product "Kydex" has a self-extinguishing combustibility rating. Furthermore, it will be apparent that only one door may be provided in lieu of the two doors 14 and 16 depicted herein. In this instance, a panel of a generally similar configuration may be utilized to provide a complete closed container.

From the foregoing, it will be apparent that the present invention provides a lightweight cargo container constructed from interchangeable and replaceable construction elements particularly designed and constructed for ease of repairing any damaged container. The cargo container is of a particular configuration adapted for use in the belly of an aircraft for carrying luggage and the like in the lower portion or cargo compartment of an aircraft.

Whereas the present invention has been described in particular relation to the drawings attached hereto, it should be understood that other and further modifications, apart from those shown or suggested herein, may be made within the spirit and scope of this invention.

What is claimed is:

1. In a cargo container for aircraft, and aircraft belly cargo compartments, a housing assembly comprising a spaced pair of identical top panels, a top cross member centrally disposed between the top panels and attached thereto, a spaced pair of identical end panels having the upper edges thereof attached at right angles top the outside edges of the respective to panel, a rectangular floor panel having each end thereof attached to the lower edge of each end panel; a front face assembly comprising a spaced pair of front face panels having the top edges thereof secured at right angles to the front edge of the respective top panels, the outside edge of each front face panel being attached at right angles to the front edge of each end panel and the bottom edge of each front face panel being attached at right angles to the front edge of the floor panel, a front base panel secured between the lower portion of the front face panels, the bottom edge of said base panel being attached at a right angle to the front edge of the floor panel; a rear face assembly substantially identical to the front face assembly and similarly attached to the rear edges of the top panels and the end panels and the floor panel; a front door member, a strip hinge member securing one edge of the front door member to the top cross member, said front door being of a substantially inverted L-shaped cross-sectional configuration with the side edges thereof disposed in the proximity of the inside edge of the top panels and front panels in the closed position of the door, latching means disposed in the lower portion of said door assembly; and a rear door assembly substantially identical to the front door assembly also hingedly attached to the top cross member whereby installation and attachment of said panels are such that they are easily replaceable.

2. A cargo container for aircraft as set forth in claim 1 wherein the lower portion of each end panel is curved inwardly to substantially conform to the interior cross-sectional shape of an aircraft belly cargo compartment, the outside edges of the front and rear face panels having a curved shape conforming to the inward curvature of said end panels.

3. A cargo container for aircraft as set forth in claim 2 wherein the panel material is that of a durable plastic alloy with properties of high rigidity, formability, toughness, chemical resistance, and a self-extinguishing combustibility rating.

4. A cargo container for aircraft as set forth in claim 3 wherein the panel material is that of the commercially available "Kydex" acrylic-polyvinyl chloride alloy.

5. A cargo container for aircraft as set forth in claim 3 wherein the panels are provided with a plurality of elongated longitudinal and transverse detents for additional strength and rigidity.

6. A cargo container for aircraft as set forth in claim 2 wherein each door assembly is hinged along the vertical portion thereof to provide both a front and rear facing subdoor.

7. A cargo container for aircraft as set forth in claim 6 wherein the strip hinge members are of a commercially available piano type hinges.

8. A cargo container for aircraft as set forth in claim 6 wherein the strip hinge members are of a flexible plastic type.

9. A cargo container for aircraft as set forth in claim 5 wherein the strip hinge members are of a flexible plastic type.

10. A cargo container for aircraft as set forth in claim 5 wherein the strip hinge members are of a commercially available piano type hinges.

11. A cargo container for aircraft as set forth in claim 10 wherein the outer periphery of the front and rear doors are provided with an inwardly extending lip at right angles to the plane of the door panels, said lip being formed as an integral part of the door panels and wherein the entire inside edges of the top and front faces are provided with outwardly extending channel strips for receiving the door edge lip therein.

12. In a cargo container for aircraft and aircraft belly cargo compartments, a housing assembly comprising a spaced pair of substantially identical interchangeable top panels, a top cross member centrally disposed between the top panels and attached thereto, a spaced pair of substantially identical interchangeable end panels attached to the top panels, a rectangular floor panel disposed between the end panels and attached thereto, a spaced pair of substantially identical interchangeable U-shaped front and rear face panels, the outer edges thereof conforming to the shape and size of the top panel, end panels and floor panel and attached to the front and rear edges thereof respectively; a pair of substantially identical interchangeable inverted L-shaped door members, hingeing means for attaching each door member to opposite sides of the top cross member with the side edges thereof disposed in the proximity of the inside edges of the top panels and front panels in the closed position of the doors, all of the panels making up said container being constructed from a durable plastic alloy with properties of high rigidity, formability, toughness, chemical resistance, and a self-extinguishing combustibility rating.

* * * * *